(12) United States Patent
Kang et al.

(10) Patent No.: US 7,710,240 B2
(45) Date of Patent: May 4, 2010

(54) RFID DEVICE HAVING NONVOLATILE FERROELECTRIC CAPACITOR

(75) Inventors: Hee Bok Kang, Daejeongwangyeok-si (KR); Jin Hong Ahn, Gyeonggi-do (KR)

(73) Assignee: Hynix Semiconductor Inc., Icheon-si (KR)

( * ) Notice: Subject to any disclaimer, the term of this patent is extended or adjusted under 35 U.S.C. 154(b) by 787 days.

(21) Appl. No.: 11/320,987

(22) Filed: Dec. 30, 2005

(65) Prior Publication Data

US 2006/0267766 A1 Nov. 30, 2006

(30) Foreign Application Priority Data

May 30, 2005 (KR) ...................... 10-2005-0045494

(51) Int. Cl.
*H04Q 5/22* (2006.01)
*G08B 13/14* (2006.01)

(52) U.S. Cl. .................. 340/10.1; 340/10.2; 340/572.1; 340/572.2

(58) Field of Classification Search .................. 340/10, 340/572.4, 572.1; 365/145
See application file for complete search history.

(56) References Cited

U.S. PATENT DOCUMENTS

| | | | |
|---|---|---|---|
| 4,419,812 A | 12/1983 | Topich | |
| 4,879,688 A | 11/1989 | Turner et al. | |
| 4,970,409 A | 11/1990 | Wada et al. | |
| 5,479,172 A * | 12/1995 | Smith et al. | 342/51 |
| 5,608,246 A | 3/1997 | Yeager et al. | |
| 5,774,392 A * | 6/1998 | Kraus et al. | 365/145 |
| 5,886,887 A | 3/1999 | Jenq | |
| 6,097,622 A * | 8/2000 | Shimizu et al. | 365/145 |
| 6,097,662 A * | 8/2000 | Itou | 365/230.03 |
| 6,661,072 B1 * | 12/2003 | Cheng | 257/431 |
| 6,781,439 B2 | 8/2004 | Tanzawa et al. | |
| 6,828,902 B2 * | 12/2004 | Casden | 340/10.3 |
| 7,012,828 B2 | 3/2006 | Kang | |
| 2003/0067027 A1 * | 4/2003 | Fox et al. | 257/303 |
| 2003/0090317 A1 * | 5/2003 | Mattisson et al. | 329/315 |
| 2003/0197548 A1 * | 10/2003 | Toyoda et al. | 327/536 |
| 2004/0125642 A1 * | 7/2004 | Oikawa et al. | 365/145 |
| 2004/0251956 A1 | 12/2004 | Pan | |
| 2006/0197668 A1 * | 9/2006 | Oliver et al. | 340/572.4 |
| 2008/0211629 A1 * | 9/2008 | Evans et al. | 340/10.1 |

FOREIGN PATENT DOCUMENTS

| | | |
|---|---|---|
| JP | 05-144275 A | 6/1993 |
| JP | 2001-283174 A | 10/2001 |
| JP | 2003-296681 A | 10/2003 |
| JP | 2005-004779 A | 1/2005 |

* cited by examiner

*Primary Examiner*—Daniel Wu
*Assistant Examiner*—Pameshanand Mahase
(74) *Attorney, Agent, or Firm*—Townsend and Townsend and Crew LLP (57) ABSTRACT

A capacitor applied to a voltage multiplier and a modulator/demodulator of a RFID device is formed as a nonvolatile ferroelectric capacitor formed by the same process of a memory cell capacitor. The nonvolatile ferroelectric capacitor has a high dielectric constant to reduce the area of the capacitor.

16 Claims, 8 Drawing Sheets

RFID DEVICE HAVING NONVOLATILE FERROELECTRIC CAPACITOR

BACKGROUND OF THE INVENTION

1. Field of the Invention

The present invention generally relates to a RFID device having a nonvolatile ferroelectric capacitor, and more specifically, to a technology of reducing the whole size of a RFID device using a nonvolatile ferroelectric capacitor formed by the same process as that of a memory cell capacitor.

2. Description of the Related Art

Generally, a ferroelectric random access memory (hereinafter, referred to as 'FeRAM') has attracted considerable attention as next generation memory device because it has a data processing speed as fast as a Dynamic Random Access Memory (hereinafter, referred to as 'DRAM') and preserves data even after the power is turned off.

The FeRAM having structures similar to the DRAM includes the capacitors made of a ferroelectric substance, so that it utilizes the high residual polarization characteristic of the ferroelectric substance in which data is not deleted even after an electric field is eliminated.

Meanwhile, a general Radio Frequency Identification device (hereinafter, referred to as "RFID") comprises a modulator and a demodulator for modulating and demodulating a radio frequency signal and a voltage multiplier for generating a power voltage.

A conventional capacitor used in the voltage multiplier, the modulator and the demodulator has a PIP (Poly-Insulator-Poly) structure. Preferably, an insulator is $SiO_2$ or $Al_2O_3$ which is an upper dielectric material.

However, since the above-described upper dielectric materials have a small dielectric constant, a large number of capacitors are used to obtain desired capacitance. As a result, the whole chip area is increased.

The conventional capacitor used in the voltage multiplier, the modulator and the demodulator is formed by a different process than that of a cell capacitor of a memory. Thus, rendering the fabrication process increasingly complicated and costly.

SUMMARY OF THE INVENTION

Various embodiments of the present invention provide method of fabricating all of the capacitors used in a RFID device as nonvolatile ferroelectric capacitors using the same process for manufacturing cell capacitors in order to reduce the size of the RFID device.

According to one embodiment of the present invention, a RFID device comprises an antenna configured to transmit and receive a radio frequency signal to/from an external communication apparatus, an analog block including a voltage multiplier configured to generate a power voltage depending on the radio frequency signal received through the antenna, a digital block configured to receive the power voltage, process the radio frequency signal received through the antenna, and transmit a response signal to the analog block, and a memory configured to store data. Preferably, the voltage multiplier comprises a plurality of rectification units each configured to rectify the radio frequency signal applied through the antenna, and a plurality of charge pumping units each configured to include a plurality of nonvolatile ferroelectric capacitors and to charge-pump a voltage rectified in the plurality of rectification units.

According to another embodiment of the present invention, a RFID device comprises an antenna configured to transmit and receive a radio frequency signal from an external communication apparatus, an analog block including a demodulator configured to demodulate an operating command signal in response to the radio frequency signal received through the antenna, a digital block configured to receive the operating command signal and process data received through the antenna to transmit a response signal to the analog block, and a memory configured to store the data. Preferably, the demodulator comprises a plurality of rectification units each configured to rectify the radio frequency signal applied through the antenna, and a plurality of charge pumping units each configured to include a plurality of nonvolatile ferroelectric capacitors and to charge-pump a voltage rectified in the plurality of rectification units.

According to still another embodiment of the present invention, a RFID device comprises an antenna configured to transmit and receive a radio frequency signal from an external communication apparatus, an analog block including a modulator configured to modulate a response signal and output the radio frequency signal through the antenna, a digital block configured to process the radio frequency signal received through the antenna and transmit the response signal to the analog block, and a memory configured to store data. Preferably, the modulator comprises a modulator driving unit configured to output a modulator driving signal in response to the response signal, and an input impedance modulation unit configured to include a plurality of serially connected nonvolatile ferroelectric capacitors and change input impedance in response to the modulator driving signal.

According to still another embodiment of the present invention, a RFID device comprises an antenna configured to transmit and receive a radio frequency signal from an external communication apparatus, an analog block including a voltage multiplier configured to generate a power voltage in response to a radio frequency signal received through the antenna, a demodulator configured to demodulate an operating command signal in response to the radio frequency signal received through the antenna, and a modulator configured to modulate a response signal and output the radio frequency signal through the antenna, a digital block configured to receive the operating command signal by the power voltage and process data to transmit the response signal to the analog block, and a memory configured to store the data. Preferably, the voltage multiplier comprises a plurality of rectification units each configured to rectify the radio frequency signal applied through the antenna, and a plurality of charge pumping units each configured to include a plurality of first nonvolatile ferroelectric capacitors and to charge-pump a voltage rectified in the plurality of rectification units. The demodulator comprises a plurality of rectification units each configured to rectify a radio frequency signal applied through the antenna and a plurality of charge pumping units each configured to include a plurality of second nonvolatile ferroelectric capacitors and to charge-pump a voltage rectified in the plurality of rectification units. The modulator comprises a modulator driving unit configured to output a modulator driving signal in response to the response signal, and an input impedance modulation unit configured to include a plurality of third nonvolatile ferroelectric capacitors and to change input impedance in response to the modulator driving signal and transmit a phase-changed signal to the antenna.

BRIEF DESCRIPTION OF THE DRAWINGS

Other aspects and advantages of the present invention will become apparent upon reading the following detailed description and upon reference to the drawings in which.

DETAILED DESCRIPTION OF THE EXEMPLARY EMBODIMENTS

The present invention will be described in detail with reference to the accompanying drawings. Wherever possible, the same reference numbers will be used throughout the drawings to refer to the same or like parts.

Figure 1:
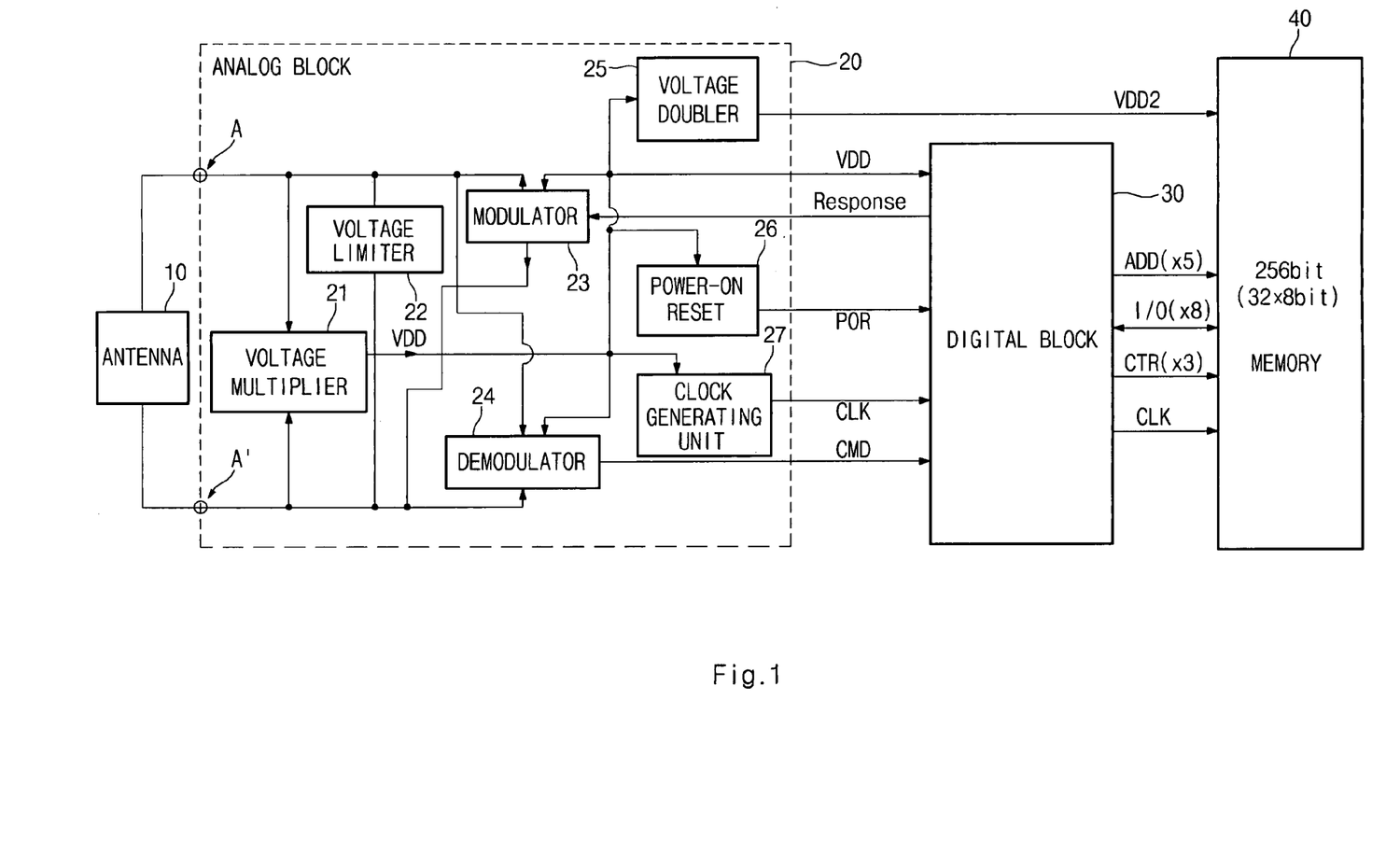
FIG. 1 is a block diagram illustrating a RFID device according to an embodiment of the present invention.

FIG. 1 is a block diagram illustrating a RFID device according to an embodiment of the present invention.

In this embodiment, the RFID device comprises an antenna 10, an analog block 20, a digital block 30 and a memory 40.

The antenna 10 transmits and receives data with an external reader or writer in response to a radio frequency signal.

The analog block 20 comprises a voltage multiplier 21, a voltage limiter 22, a modulator 23, a demodulator 24, a voltage doubler 25, a power-on reset unit 26 and a clock generating unit 27.

The voltage multiplier 21 is connected to the antenna 10 through terminals A, A' and generates a power voltage VDD of the RFID device in response the radio frequency signal applied from the antenna 10.

The voltage limiter 22 is connected to the antenna 10 through the terminals A, A' and limits a voltage of the radio frequency signal applied from the antenna 10.

The modulator 23 is connected to the antenna 10 through the terminals A, A' and modulates a response signal Response applied from the digital block 30 to transmit the signal to the antenna 10.

The demodulator 24 is connected to the antenna 10 through the terminals A, A' and detects an operating command signal from the radio frequency signal applied from the antenna 10 by the power voltage VDD to output a command signal CDM to the digital block 30.

The voltage doubler 25 boosts the power voltage VDD applied from the voltage multiplier 21 to supply a boosting voltage VDD2 having a swing width twice larger than that of the power voltage VDD to the memory 40.

The power-on reset unit 26 senses the power voltage VDD applied from the voltage multiplier 21 to output a power-on reset signal POR for controlling a reset operation to the digital block 30.

The clock generating unit 27 generates a clock signal CLK by the power voltage VDD.

The digital block 30 receives the power voltage VDD, the power-on reset signal POR, the clock signal and the command signal CMD from the analog block 20 to output the response signal Response to the analog block 20. The digital block 30 outputs an address ADD, data I/O, a control signal CTR and a clock signal CLK to the memory 40.

The memory 40 comprises a plurality of memory cells each including a nonvolatile ferroelectric capacitor.

Figure 2:
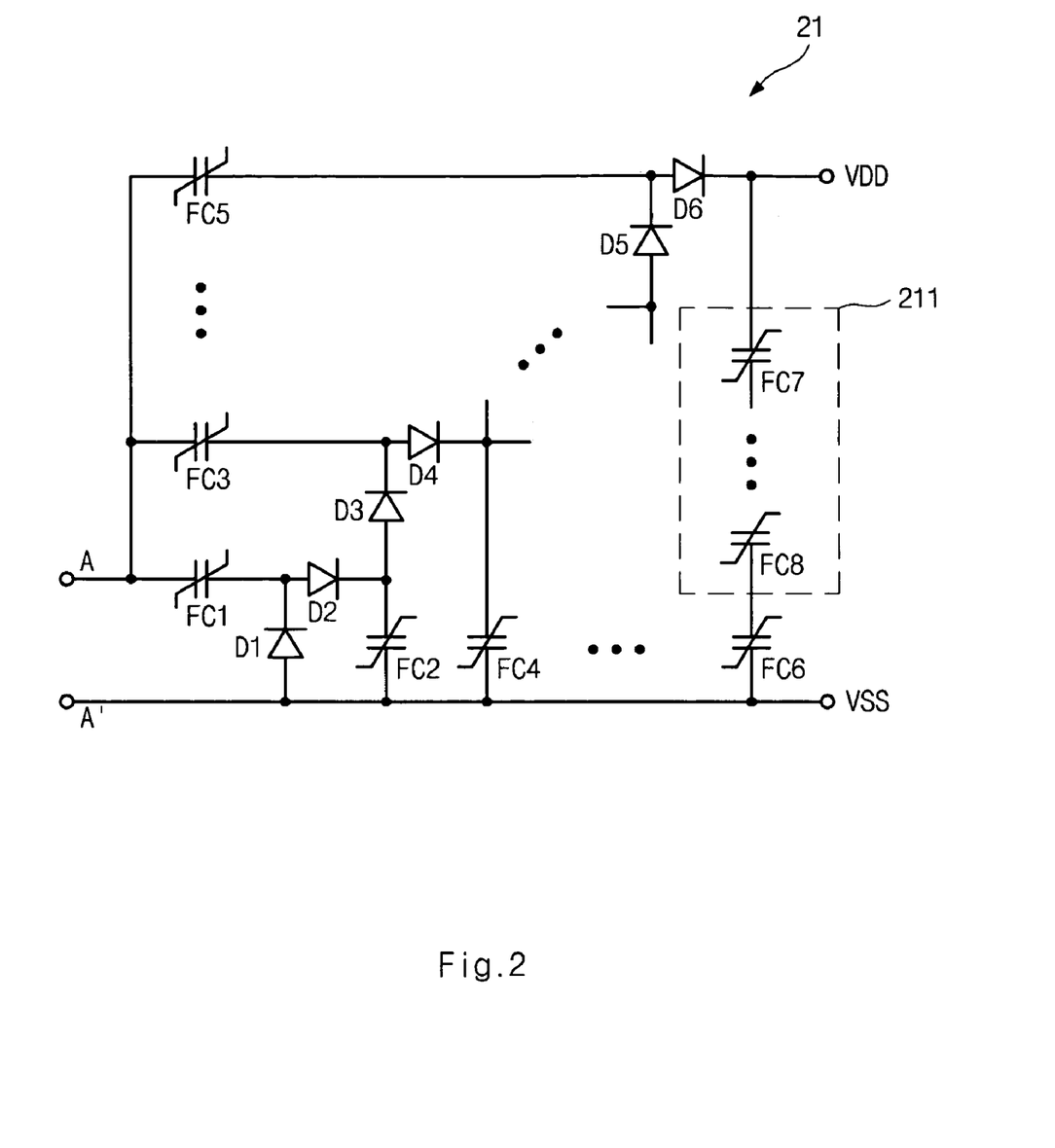
FIG. 2 is a circuit diagram illustrating an example of a voltage multiplier of FIG. 1.

FIG. 2 is a circuit diagram illustrating an example of the voltage multiplier 21 of FIG. 1.

The voltage multiplier 21 comprises a plurality of schottky diodes D1~D6, a plurality of nonvolatile ferroelectric capacitors FC1~FC6 and a stress preventing circuit 211. The stress preventing circuit 211 comprises a plurality of nonvolatile ferroelectric capacitors FC7~FC8.

The voltage multiplier 21 outputs the power voltage VDD to an output terminal by a rectification operation and a charge pumping operation when the radio frequency signal is received from the antenna 10. The rectification operation is performed in the plurality of schottky diodes D1~D6, and the charge pumping operation is performed in the plurality of nonvolatile ferroelectric capacitors FC1~FC8. The power voltage is an operating voltage of the RFID device.

Charges are stored in the nonvolatile ferroelectric capacitor FC2 by the rectification operation of the diodes D1 and D2. The charges stored in the nonvolatile ferroelectric capacitor FC2 are pumped by the rectification operation of the diodes D3 and D4, and stored in the nonvolatile ferroelectric capacitor FC4. The rectification operation and the pumping operation are sequentially performed to generate the power voltage VDD through the diodes D5 and D6 of the final terminal.

When a voltage greater than a threshold voltage is applied to the plurality of nonvolatile ferroelectric capacitors FC1~FC6, dielectric materials of the plurality of nonvolatile ferroelectric capacitors FC1~FC6 are damaged by voltage stress and increases leakage current.

To prevent increase of leakage current, the stress preventing circuit 211 prevents a voltage over the threshold voltage (for example, about 0.5V) from being applied to the plurality of nonvolatile ferroelectric capacitors FC1~FC6.

The stress preventing circuit 211 comprises a plurality of serially connected nonvolatile ferroelectric capacitors FC7~FC8 each having a predetermined voltage (for example, about 0.5V) between a power voltage VDD output terminal and a ground voltage VSS output terminal.

As a result, the voltage stress greater than the threshold voltage is prevented from being applied to the plurality of nonvolatile ferroelectric capacitors FC1~FC6, so that the power voltage VDD is operated only in a stabilized intrinsic area.

Figure 3:
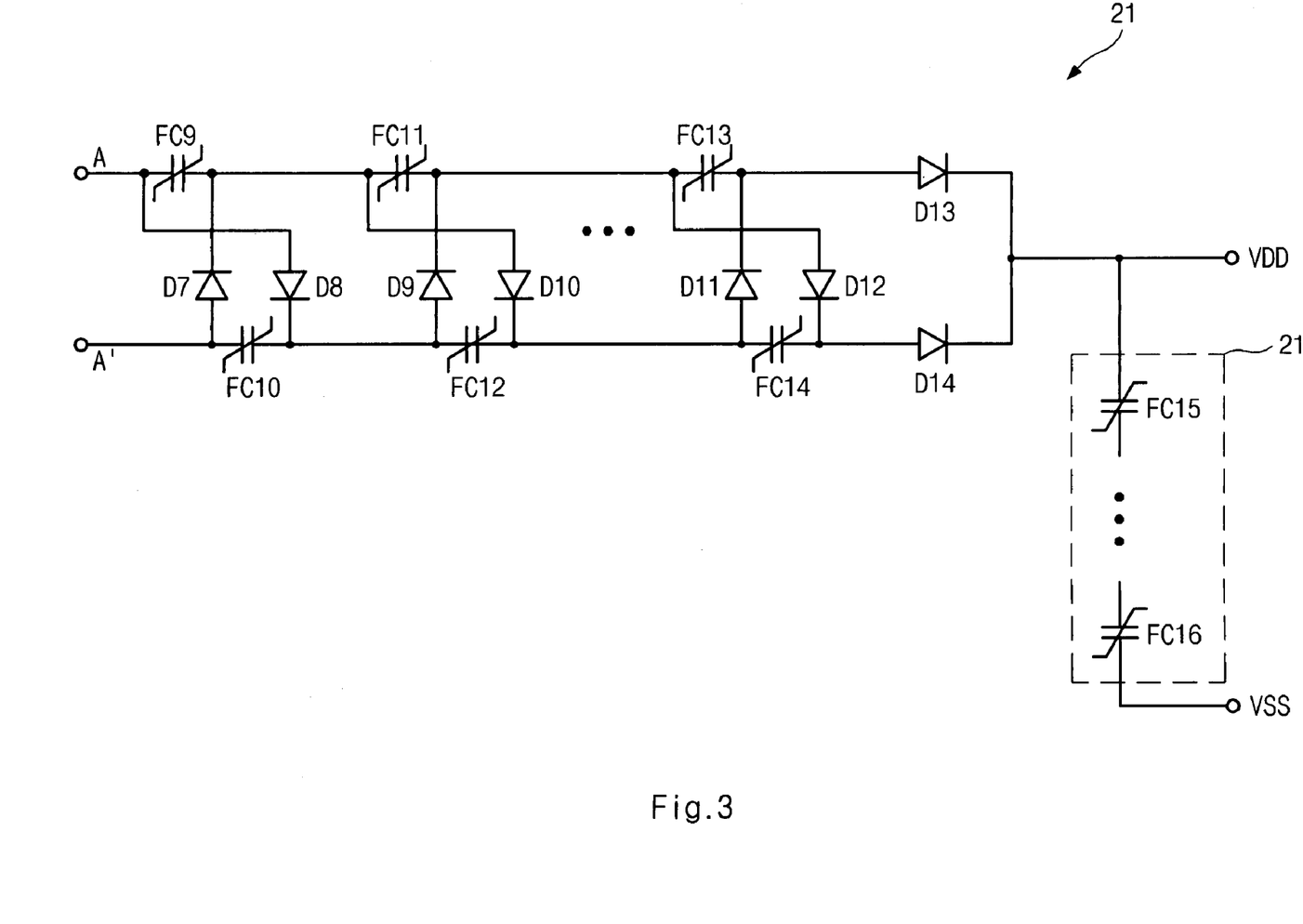
FIG. 3 is a circuit diagram illustrating another example of a voltage multiplier of FIG. 1.

FIG. 3 is a circuit diagram illustrating another example of the voltage multiplier 21 of FIG. 1.

The voltage multiplier 21 comprises a plurality of schottky diodes D7~D14, a plurality of nonvolatile ferroelectric capacitors FC9~FC14 and the stress preventing circuit 211. The stress preventing circuit 211 comprises a plurality of nonvolatile ferroelectric capacitors FC15~FC16.

The voltage multiplier 21 has a different connection relationship of diodes and capacitors from that of FIG. 2. In other words, one terminal of the nonvolatile ferroelectric capacitor FC9 is connected to the other terminal of the nonvolatile ferroelectric capacitor FC10 through the diode D8, and one terminal of the nonvolatile ferroelectric capacitor FC10 is connected to the other terminal of the nonvolatile ferroelectric capacitor FC9 through the diode D7. The connection relationship of the nonvolatile ferroelectric capacitors FC11~FC14 and the diodes D9~D12 is the same as that of the nonvolatile ferroelectric capacitors FC9 and FC10 and the diodes D7 and D8. The power voltage VDD is generated through the diodes D13 and D14 of the final terminal.

The voltage multiplier 21 generates the power voltage VDD by the rectification operation and the charge pumping operation when the radio frequency signal is applied from the antenna 10. The rectification operation is performed by the plurality of schottky diodes D7~D14. The charge pumping operation is performed by the plurality of the plurality of nonvolatile ferroelectric capacitors FC9~FC14. The power voltage VDD is an operating voltage of the RFID device.

When a voltage greater than a threshold voltage is applied to the plurality of nonvolatile ferroelectric capacitors FC9~FC14, dielectric materials of the plurality of nonvolatile ferroelectric capacitors FC9~FC14 are damaged by voltage stress and increases leakage current.

To prevent increase of leakage current, the stress preventing circuit 211 prevents a voltage over the threshold voltage (for example, about 0.5V) from being applied to the plurality of nonvolatile ferroelectric capacitors FC9~FC14.

The stress preventing circuit 211 comprises a plurality of serially connected nonvolatile ferroelectric capacitors FC15~FC16 each having a predetermined voltage (for example, about 0.5V) between the power voltage VDD output terminal and the ground voltage VSS output terminal.

As a result, the voltage stress greater than the threshold voltage is prevented from being applied to the plurality of nonvolatile ferroelectric capacitors FC9~FC14, so that the power voltage VDD is operated only in a stabilized intrinsic area.

Figure 4:
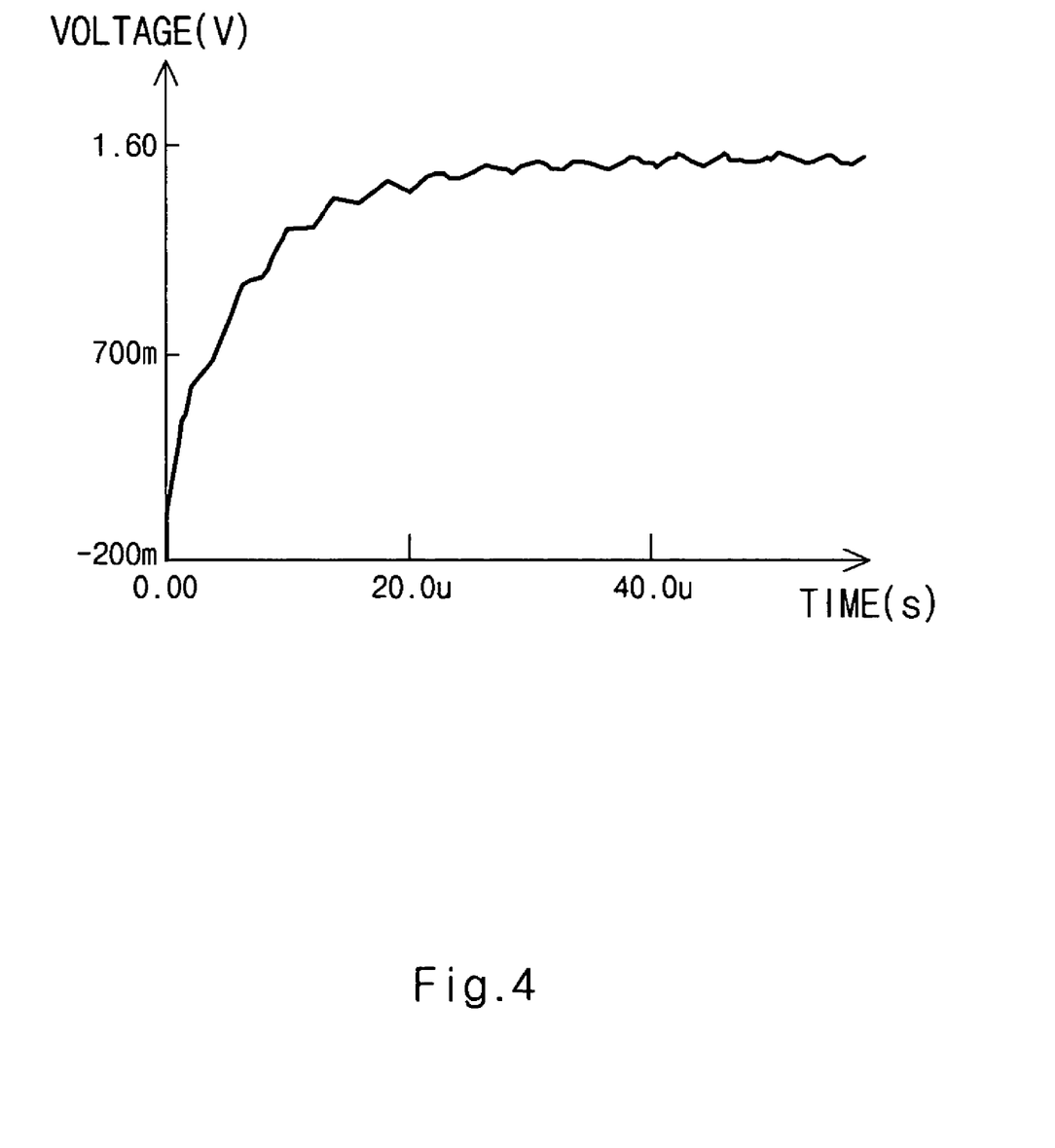
FIG. 4 is a waveform diagram illustrating an output voltage of the voltage multiplier of FIGS. 2 and 3.

FIG. 4 is a waveform diagram illustrating the power voltage VDD generated from the voltage multiplier 21 of FIGS. 2 and 3.

Referring to FIG. 4, when the radio frequency signal of 900 MHz is applied from the antenna 10, it is shown that the power voltage VDD outputted from the voltage multiplier 21 is about 1.4V while a peak-to-peak input voltage is 200 mV and an output current is 10 μA.

Figure 5:
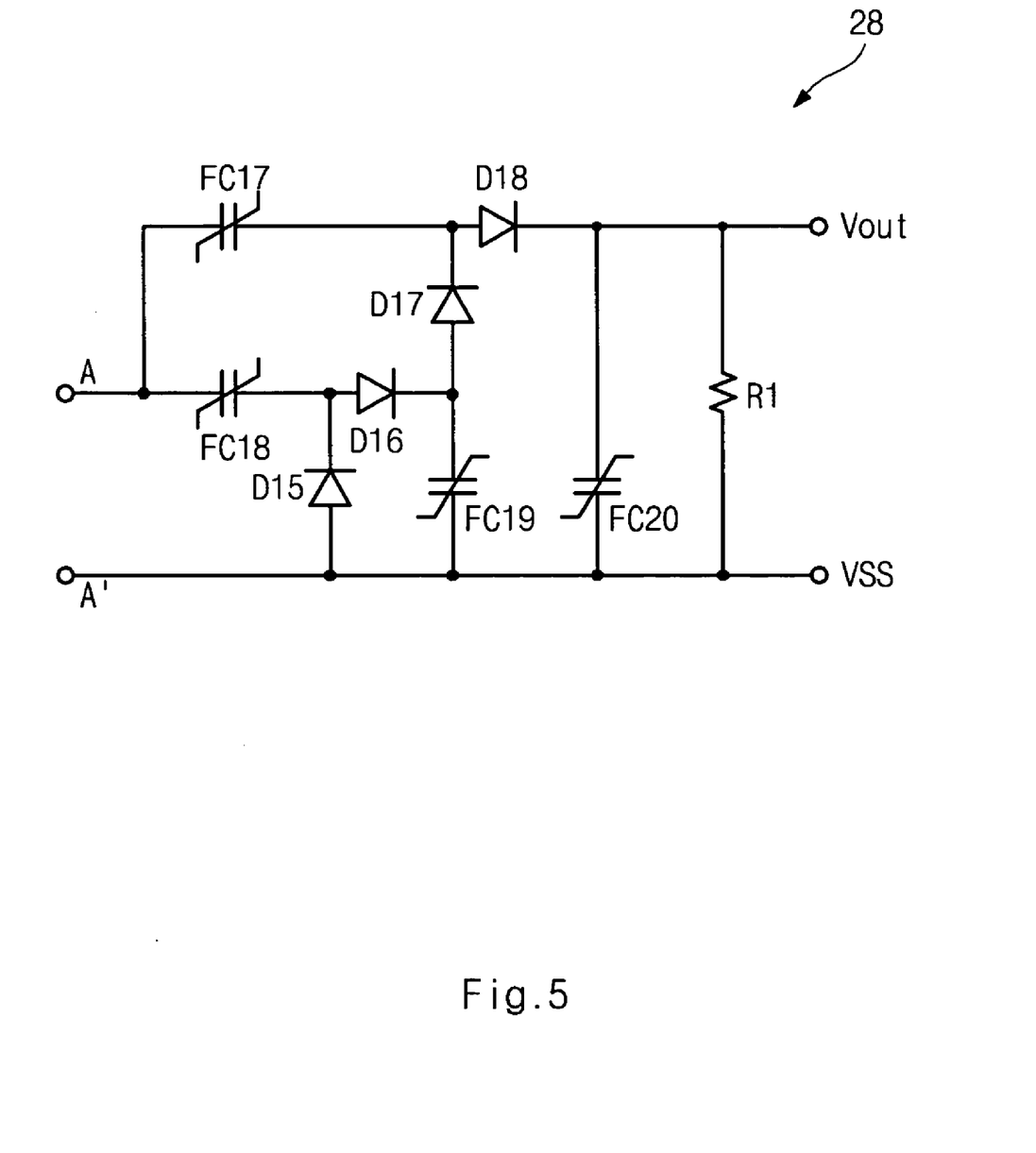
FIG. 5 is a circuit diagram illustrating an example of an envelope detector used in a demodulator of FIG. 1.

FIG. 5 is a circuit diagram illustrating an example of an envelope detector 28 used in the demodulator 24 of FIG. 1.

The envelope detector 28 of FIG. 5 comprises a plurality of schottky diodes D15~D18, a plurality of nonvolatile ferroelectric capacitors FC17~FC20 and a resistor R1.

The envelope detector 28 stores charges in the nonvolatile ferroelectric capacitor FC19 by the rectification operation of the diodes D15 and D16, and pumps charges stored in the nonvolatile ferroelectric capacitor FC19 by the rectification operation of the diodes D17 and D18 to store the pumped charges in the nonvolatile ferroelectric capacitor FC20. These rectification and pumping operations are sequentially performed to output an output voltage Vout. The resistor R1 is positioned between an output terminal and a ground terminal.

The envelope detector 28 outputs the command signal CMD having a level of the output voltage Vout to the digital block 30 by the rectification operation of the plurality of schottky diodes D15~D18 and the charge-pumping operation of the plurality of nonvolatile ferroelectric capacitors FC15~FC20 when the radio frequency signal is applied from the antenna 10.

The number of the diodes D15~D18 of the envelope detector 28 is limited in four, so that the output voltage Vout is limited in a low voltage.

Preferably, the capacitance of the nonvolatile ferroelectric capacitors FC17~FC20 is designed to be smaller than that of the capacitor used in the voltage multiplier 21.

Figure 6:
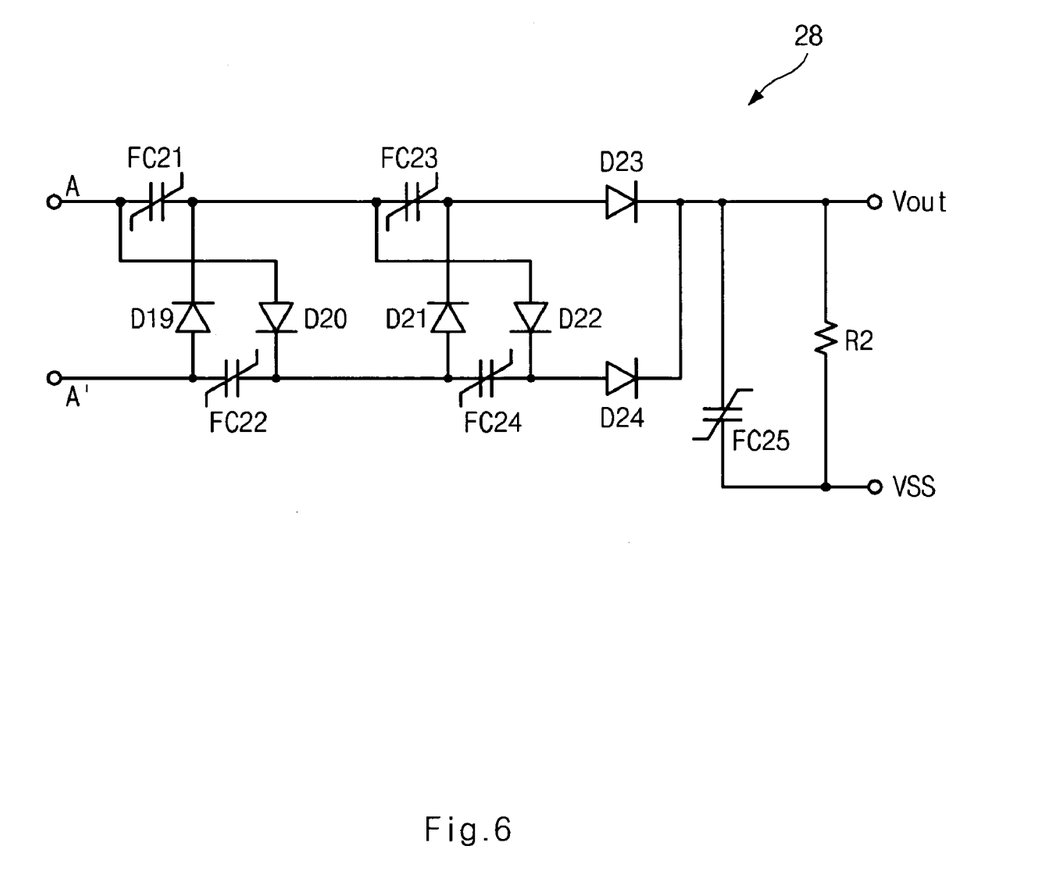
FIG. 6 is a circuit diagram illustrating another example of an envelope detector used in a demodulator of FIG. 1.

FIG. 6 is a circuit diagram illustrating another example of an envelope detector 28 used in the demodulator 24 of FIG. 1.

The envelope detector 28 of FIG. 6 comprises a plurality of schottky diodes D19~D23, a plurality of nonvolatile ferroelectric capacitors FC21~FC25, and a resistor R2.

The envelope detector 28 of FIG. 6 has a different diode and capacitor connection relationship from that of FIG. 5. That is, one terminal of the nonvolatile ferroelectric capacitor FC21 is connected to the other terminal of the nonvolatile ferroelectric capacitor FC22 through the diode D20, and one terminal of the nonvolatile ferroelectric capacitor FC22 is connected to the other terminal of the nonvolatile ferroelectric capacitor FC21 through the diode D19. The connection relationship of the nonvolatile ferroelectric capacitors FC23, FC24 and the diodes D21, D22 is the same as that of the nonvolatile ferroelectric capacitors FC21, FC22 and the diodes D19, D20. The output voltage Vout is stored in the nonvolatile ferroelectric capacitor FC25 through the diodes D23, D24 of the final terminal.

The above-described envelope detector 60 outputs the command signal CMD having a level of the output voltage Vout to the digital block 30 by the rectification operation of the plurality of schottky diodes D19~D23 and the charge-pumping operation of the plurality of nonvolatile ferroelectric capacitors FC21~FC24 when the radio frequency signal is applied from the antenna 10.

The number of the diodes D19~D22 of the envelope detector 28 is limited in four, so that the output voltage Vout is limited in a low voltage.

Preferably, the capacitance of the nonvolatile ferroelectric capacitors FC21~FC24 is designed to be smaller than that of the capacitor used in the voltage multiplier 21.

Figure 7:
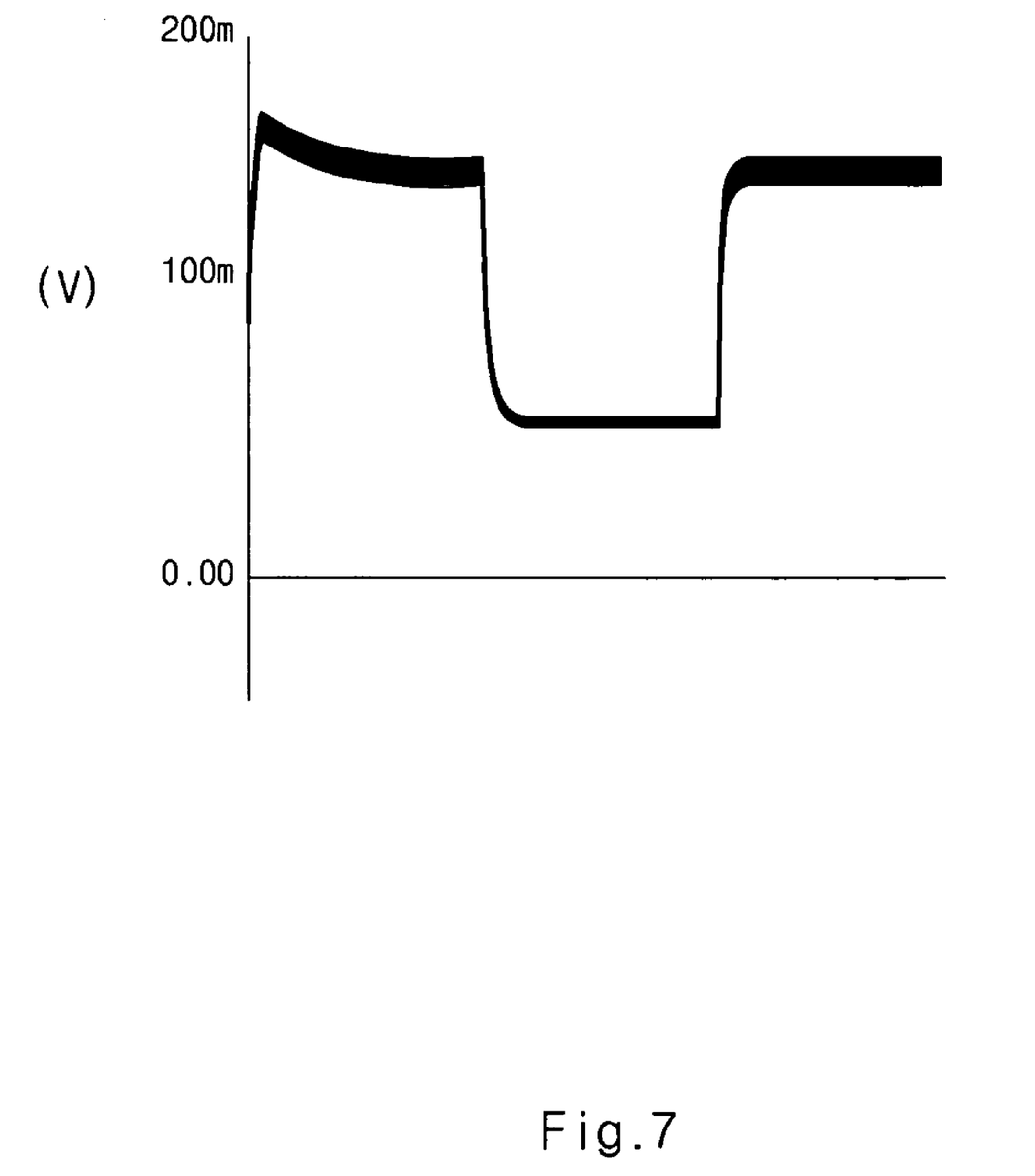
FIG. 7 is a waveform diagram illustrating an output voltage of the envelope detector of FIGS. 5 and 6.

FIG. 7 is a waveform diagram illustrating an output voltage of the envelope detector 28 of FIGS. 5 and 6.

Referring to FIG. 7, the envelope detector 28 outputs the command signal CMD having a level of the output voltage Vout when it receives the radio frequency signal from the antenna 10 to sense the operating command signal.

Figure 8:
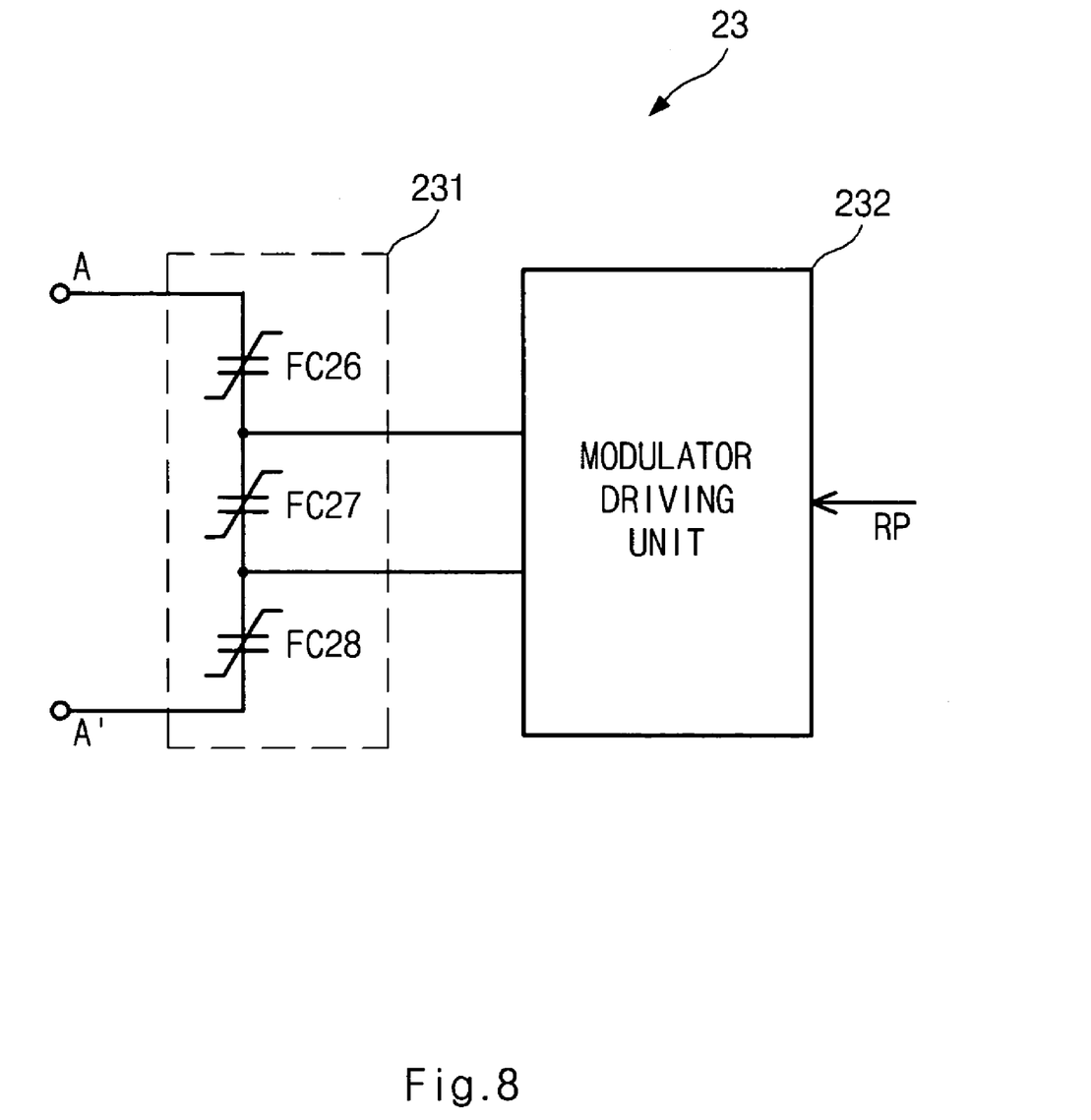
FIG. 8 is a block diagram illustrating a modulator of FIG. 1.

FIG. 8 is a block diagram illustrating the modulator 23 of FIG. 1.

The modulator 23 comprises an input impedance modulation unit 231 and a modulator driving unit 232. The input impedance modulation unit 231 comprises a plurality of serially connected nonvolatile ferroelectric capacitors FC26~FC28 each configured to receive an output signal of the modulator driving unit 232 through each command connection terminal.

The modulating operation of the modulator 23 is performed by a backscatter operation. That is, the modulator driving unit 232 outputs a modulator driving signal to the input impedance modulation unit 231 in response to the response signal Response applied from the digital block 30.

When a backward connection is activated, a reader transmits a carrier signal having a continuous frequency. Then, the input impedance modulation unit 231 changes input impedance to modulate the radio frequency signal backscattered from the antenna 10. As a result, the modulator 23 changes input capacitance and performs a phase modulation to transmit the backscattered radio frequency signal to an external reader through the antenna 10.

The nonvolatile ferroelectric capacitor utilized in the present embodiment of the present invention is formed by the same process as that of a capacitor of a memory cell. As a dielectric material of the capacitor, $SrBi_2Ta_2O_9$ (SBT) or PbZrTiO (PZT) which have a high dielectric constant is used. The dielectric constant of the SBT is 250, and the dielectric constant of the PZT is 500. As a result, the area of the capacitor used in the RFID device can be reduced.

As described above, a capacitor used in a RFID device according to an embodiment of the present invention is formed by the same process as that of a memory cell to simplify the process.

In addition, the capacitor has a high dielectric constant to reduce the whole size of the RFID device.

The foregoing description of various embodiments of the invention has been presented for purposes of illustration and description. It is not intended to be exhaustive or to limit the invention to the precise form disclosed, and modifications and variations are possible in light of the above teachings or may be acquired from practice of the invention. Thus, the embodiments were chosen and described in order to explain the principles of the invention and its practical application to enable one skilled in the art to utilize the invention in various embodiments and with various modifications as are suited to the particular use contemplated.

What is claimed is:

1. A RFID device comprising:
an antenna configured to transmit and receive a radio frequency signal to/from an external communication apparatus;
an analog block including a voltage multiplier configured to generate a power voltage depending on the radio frequency signal received through the antenna;
a digital block configured to receive the power voltage, process the radio frequency signal received through the antenna, and transmit a response signal to the analog block; and
a memory including a plurality of memory cells, wherein each memory cell includes a first nonvolatile ferroelectric capacitor configured to store data,
wherein the voltage multiplier comprises:
a plurality of rectification units each configured to rectify the radio frequency signal applied through the antenna;
a plurality of charge pumping units each configured to include a plurality of second nonvolatile ferroelectric capacitors and to charge-pump a voltage rectified in the plurality of rectification units using the second nonvolatile ferroelectric capacitors; and
a stress prevention unit configured to prevent application of a voltage stress over a threshold voltage to the plurality of second nonvolatile ferroelectric capacitors wherein the stress is not due to an external physical stress.

2. The RFID device of claim 1, wherein the stress prevention unit comprises a plurality of third ferroelectric capacitors each configured to be serially connected between an output terminal and a ground terminal and to store a predetermined voltage.

3. The RFID device of claim 1, wherein each of the plurality of second nonvolatile ferroelectric capacitors is formed by an identical process as that used to form the first nonvolatile ferroelectric capacitors of the memory.

4. The RFID device of claim 1, wherein a dielectric material of each of the plurality of second nonvolatile ferroelectric capacitors is $SrBi_2Ta_2O_9$ (SBT).

5. The RFID device of claim 1, wherein a dielectric material of each of the plurality of second nonvolatile ferroelectric capacitors is PbZrTiO (PZT).

6. The RFID device of claim 1, wherein the rectification unit comprises a plurality of schottky diodes.

7. A RFID device comprising:
an antenna configured to transmit and receive a radio frequency signal from an external communication apparatus;
an analog block including a demodulator configured to demodulate an operating command signal in response to the radio frequency signal received through the antenna;
a digital block configured to receive the operating command signal and process data received through the antenna to transmit a response signal to the analog block; and
a memory including a plurality of memory cells, wherein each memory cell includes a first nonvolatile ferroelectric capacitor configured to store the data,
wherein the demodulator comprises:
a plurality of rectification units each configured to rectify the radio frequency signal applied through the antenna; and
a plurality of charge pumping units each configured to include a plurality of second nonvolatile ferroelectric capacitors and to charge-pump a voltage rectified in the plurality of rectification units using the second nonvolatile ferroelectric capacitors,
wherein each of the plurality of second nonvolatile ferroelectric capacitors is formed by an identical process as that used to form the first nonvolatile ferroelectric capacitors of the memory.

8. The RFID device of claim 7, wherein the demodulator further comprises a resistor unit connected between an output terminal and a ground terminal.

9. The RFID device of claim 7, wherein a dielectric material of each of the plurality of second nonvolatile ferroelectric capacitors is $SrBi_2Ta_2O_9$ (SBT).

10. The RFID device of claim 7, wherein a dielectric material of each of the plurality of second nonvolatile ferroelectric capacitors is PbZrTiO (PZT).

11. The RFID device of claim 7, wherein the rectification unit includes a plurality of schottky-diodes.

12. A RFID device comprising:
an antenna configured to transmit and receive a radio frequency signal from all external communication apparatus;
an analog block including:
a voltage multiplier configured to generate a power voltage in response to a radio frequency signal received through the antenna, and
a modulator configured to modulate a response signal and output the radio frequency signal through the antenna;
a digital block configured to process the radio frequency signal received through the antenna and transmit the response signal to the analog block; and
a memory including a plurality of memory cells, wherein each memory cell includes a first nonvolatile ferroelectric capacitor configured to store data,
wherein the voltage multiplier comprises:
a plurality of rectification units each configured to rectify the radio frequency signal applied through the antenna, and
a plurality of charge pumping units each configured to include a plurality of second nonvolatile ferroelectric capacitors and to charge-pump a voltage rectified in the plurality of rectification units using the second nonvolatile ferroelectric capacitors,
wherein the modulator comprises:
a modulator driving unit configured to output a modulator driving signal in response to the response signal; and
an input impedance modulation unit configured to include a plurality of serially connected third nonvolatile ferroelectric capacitors, to change input capacitance in response to the modulator driving signal using the second nonvolatile ferroelectric capacitors, and to transmit a phase-changed signal to the antenna,
wherein each of the plurality of second nonvolatile ferroelectric capacitors and third nonvolatile ferroelectric capacitors are formed by an identical process as that used to form the first nonvolatile ferroelectric capacitors of the memory.

13. The RFID device of claim 12, wherein each of the plurality of third nonvolatile ferroelectric capacitors is configured to receive the modulator driving signal through a common connection terminal.

14. The RFID device of claim 12, wherein a dielectric material of each of the plurality of third nonvolatile ferroelectric capacitors is $SrBi_2Ta_2O_9$ (SBT).

15. The RFID device of claim 12, wherein a dielectric material of each of the plurality of third nonvolatile ferroelectric capacitors is PbZrTiO (PZT).

16. A RFID device comprising:
- an antenna configured to transmit and receive a radio frequency signal from an external communication apparatus;
- an analog block including a voltage multiplier configured to generate a power voltage in response to a radio frequency signal received through the antenna, a demodulator configured to demodulate an operating command signal in response to the radio frequency signal received through the antenna, and a modulator configured to modulate a response signal and output the radio frequency signal through the antenna;
- a digital block configured to receive the operating command signal by the power voltage and process data to transmit the response signal to the analog block; and
- a memory including a plurality of memory cells, wherein each memory cell includes a first nonvolatile ferroelectric capacitor configured to store the data, wherein the voltage multiplier comprises:
- a plurality of rectification units each configured to rectify the radio frequency signal applied through the antenna, and
- a plurality of charge pumping units each configured to include a plurality of second nonvolatile ferroelectric capacitors and to charge-pump a voltage rectified in the plurality of rectification units using the second nonvolatile ferroelectric capacitors;

wherein the demodulator comprises:
- a plurality of rectification units each configured to rectify a radio frequency signal applied through the antenna, and
- a plurality of charge pumping units each configured to include a plurality of third nonvolatile ferroelectric capacitors to charge-pump a voltage rectified in the plurality of rectification units using the third nonvolatile ferroelectric capacitors; and wherein the modulator comprises:
- a modulator driving unit adapted and configured to output a modulator driving signal in response to the response signal, and
- an input impedance modulation unit configured to include a plurality of serially connected fourth nonvolatile ferroelectric capacitors and to change input capacitance in response to the modulator driving signal using the fourth nonvolatile ferroelectric capacitors and transmit a phase-changed signal to the antenna, wherein each of the second, third and fourth nonvolatile ferroelectric capacitors are formed by an identical process as that used to form the first nonvolatile ferroelectric capacitors of the memory.

* * * * *